US012783887B2

(12) United States Patent
Ferreira et al.

(10) Patent No.: US 12,783,887 B2
(45) Date of Patent: Nov. 3, 2026

(54) ADAPTIVE GRADIENT COMPRESSOR FOR FEDERATED LEARNING WITH CONNECTED VEHICLES UNDER CONSTRAINED NETWORK CONDITIONS

(71) Applicant: Dell Products L.P., Round Rock, TX (US)

(72) Inventors: Paulo Abelha Ferreira, Rio de Janeiro (BR); Pablo Nascimento Da Silva, Niteroi (BR); Roberto Nery Stelling Neto, Rio de Janeiro (BR); Vinicius Michel Gottin, Rio de Janeiro (BR)

(73) Assignee: Dell Products L.P., Round Rock, TX (US)

( * ) Notice: Subject to any disclaimer, the term of this patent is extended or adjusted under 35 U.S.C. 154(b) by 1224 days.

(21) Appl. No.: 17/659,146

(22) Filed: Apr. 13, 2022

(65) Prior Publication Data

US 2023/0334319 A1 Oct. 19, 2023

(51) Int. Cl.
*G06N 3/082* (2023.01)
*G06F 17/18* (2006.01)
*G06N 3/063* (2023.01)

(52) U.S. Cl.
CPC ............. *G06N 3/082* (2013.01); *G06F 17/18* (2013.01); *G06N 3/063* (2013.01)

(58) Field of Classification Search
CPC ........ G06N 3/082; G06N 3/063; G06N 3/098; G06F 17/18
See application file for complete search history.

(56) References Cited

U.S. PATENT DOCUMENTS

| | | | | |
|---|---|---|---|---|
| 2020/0167639 | A1* | 5/2020 | Xue | G06F 18/217 |
| 2022/0124518 | A1* | 4/2022 | Pezeshki | G06N 20/00 |
| 2022/0138498 | A1* | 5/2022 | Abelha Ferreira | G06F 18/217 382/159 |
| 2022/0261648 | A1* | 8/2022 | Bhalgat | G06N 3/084 |
| 2022/0383204 | A1* | 12/2022 | Thakkar | G06N 20/20 |

OTHER PUBLICATIONS

Basu et al., "Qsparse-local-SGD: Distributed SGD with Quantization, Sparsification, and Local Computations," arXiv: 1906.02367v2 [stat.ML] Nov. 2, 2019 (Year: 2019).*

Wangni et al., "Gradient Sparsification for Communication-Efficient Distributed Optimization," arXiv:1710.09854v1 [cs.LG] Oct. 26, 2017 (Year: 2017).*

(Continued)

*Primary Examiner* — Kevin W Figueroa
*Assistant Examiner* — Yao David Huang
(74) *Attorney, Agent, or Firm* — Workman Nydegger

(57) ABSTRACT

One example method includes, in an edge node, of a group of edge nodes that are each operable to communicate with a central node, performing operations that include generating a vector that includes gradients associated with a model instance, of a central model, that is operable to run at the edge node, performing a check to determine whether the model instance is overfitting to data generated at the edge node, and either performing sign compression on the vector when overfitting is not indicated, or performing random perc sign compression on the vector when overfitting is indicated, and transmitting the vector, after compression, to the central node that includes the central model.

18 Claims, 7 Drawing Sheets

(56) References Cited

OTHER PUBLICATIONS

Turkson et al., "Unsupervised Multi-layer Spiking Convolutional Neural Network Using Layer-Wise Sparse Coding," in H. Yang et al. (Eds.): ICONIP 2020, LNCS 12534, pp. 353-365, 2020 (Year: 2020).*
Sattler et al., "Robust and Communication-Efficient Federated Learning From Non-i.i.d. Data," in IEEE Transactions on Neural Networks and Learning Systems, vol. 31, No. 9, pp. 3400-3413, Sep. 2020, doi: 10.1109/TNNLS.2019.2944481 (Year: 2020).*
Sattler et al., "Sparse Binary Compression: Towards Distributed Deep Learning with minimal Communication," 2019 International Joint Conference on Neural Networks (IJCNN), Budapest, Hungary, 2019, pp. 1-8, doi: 10.1109/IJCNN.2019.8852172 (Year: 2019).*
Sun et al., "meProp: Sparsified Back Propagation for Accelerated Deep Learning with Reduced Overfitting," Proceedings of the 34th International Conference on Machine Learning, Sydney, Australia, PMLR 70, 2017 (Year: 2017).*
Frost & Sullivan and Dell Technologies, "Intelligent Connected Mobility Is Reaching an Inflection Point—A Data-centric Future Requires a Platform Approach," 2019. [Online]. Available: https://inside.dell.com/servlet/JiveServlet/download/420599-8-1212493.
J. Bernstein, Y.-X. Wang, K. Azizzadenesheli and A. Anandkumar, "signSGD: Compressed optimisation for non-convex problems.," arXiv preprint arXiv:1802.04434, 2018.

* cited by examiner

600

```
v_i^e   # Val loss from edge node i at round e
a_i^e   # Slope of the linear regression line
E       # Number of FL rounds
ϵ       # Threshold for linear regression slope
∇_i^e   # Gradient of node i at round e
∇^e     # Aggregated gradient at round e
m       # Model
ϵ       # Threshold for linear regression slope
l       # Validation curve lookback
K_i     # List of validation losses
I       # List of edge nodes

m    ← initial model
∇^e  ← 0
communicate: new round of FL to start
at edge node   i: K_i ← [ ]
communicate: m, ∇^e, ϵ , l
for e in E
        at edge node i
              train model
              if switched
                    v_i^e ← validate model m
                    K_i .append ( v_i^e )
              if len (K_i) > l and not switched
                    a_i^e, b_i^e ← LinearReg (K_i)
                    if a_i^e ≥ ϵ
                           switch compressor to RPS
                           K_i ← [ ]
                           switched ← True
              obtain ∇_i^e from m
              compress ∇_i^e
              communicate: ∇_i^e, a_i^e
        for i in I
              if a_i^e ≥ ϵ
                     switch decompressor d_i to RPS
              ∇_i^e ← decompress gradient ∇_i^e
        ∇_i^e ← aggregate gradients ∇_i^e
        communicate: ∇^e
```

FIG. 6

ADAPTIVE GRADIENT COMPRESSOR FOR FEDERATED LEARNING WITH CONNECTED VEHICLES UNDER CONSTRAINED NETWORK CONDITIONS

FIELD OF THE INVENTION

Embodiments of the present invention generally relate to federated learning as applied to a group of connected nodes. More particularly, at least some embodiments of the invention relate to systems, hardware, software, computer-readable media, and methods for compression of gradients generated by the nodes so as to reduce the amount of data sent from the nodes to a central node, and for detection and avoidance of overfitting at one or more of the nodes.

BACKGROUND

Certain situations may arise in which there is an interest in creating and using a prediction model that is to be trained from, and then deployed to, a massive number of nodes, but the creation and use of such a model may be constrained by, for example, one or more of energy, network bandwidth, training resources, or privacy concerns regarding data at each node. By way of illustration, this situation may occur when there is a need to train a number of networked vehicles, using their own respective data, to build a common central model for road object prediction, for instance, so that after the vehicles have each received the common central model, all of the vehicles are able to effectively deal with any road objects they may encounter. Federated learning (FL) may be a possible approach for addressing these problems, where, during training, only the learning information is communicated from the vehicles to a model training entity, but the actual data generated by the vehicles is not communicated to the model training entity. Nonetheless, federated learning still incurs in network costs by having to send the training information, which may take the form of gradients, for example. Following is a more detailed discussion of these problems.

Particularly, some environments may include a massive number of edge nodes and might be facing constrained network conditions and, as such, there is an interest in keeping network bandwidth usage at a minimum. While data compression techniques exist that may be used in federated learning approaches, those are usually suited for different situations. For example, some data compressors produce better results at the beginning of an optimization process, while other data compressors may tend to produce better results at the end of an optimization process.

Thus, training a model in a federated learning regime under very low network bandwidth constraints may pose a number of challenges, one of which is keeping the network bandwidth cost to a minimum. Since it may be assumes that very low-bandwidth conditions are present, there will be a sharp trade off when sending gradients from edge nodes to the central node. To this end, there is a need to send the gradients in the most efficient way possible while ensuring that the gradients contain enough of the right information to allow for good training of the model. This may be a challenge since possible solutions to this problem should aim to be Pareto efficient in the trade-off curve between the amount of information sent and the speed/quality of learning.

Another problem that may be experienced in current federated learning approaches concerns generalization errors that may be experienced. Particularly, in some federated learning approaches, each edge node, such as a vehicle for example, is trained on its own data before sending the gradients to the central node. However, there is always the risk that each node will specialize the learning based on its own data, such that the node, or particularly, the model running at the node is unable to generalize to accommodate newer data, or other data that is different from the training data. Thus, it may be difficult to build a model and send the relevant gradient information so that the central node will be able to combine all the edge gradients into a model that generalizes well for all of the nodes involved.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

FIG. 6 discloses an algorithm for selecting a vector compression process, according to some example embodiments.

DETAILED DESCRIPTION OF SOME EXAMPLE EMBODIMENTS

Figure 1:
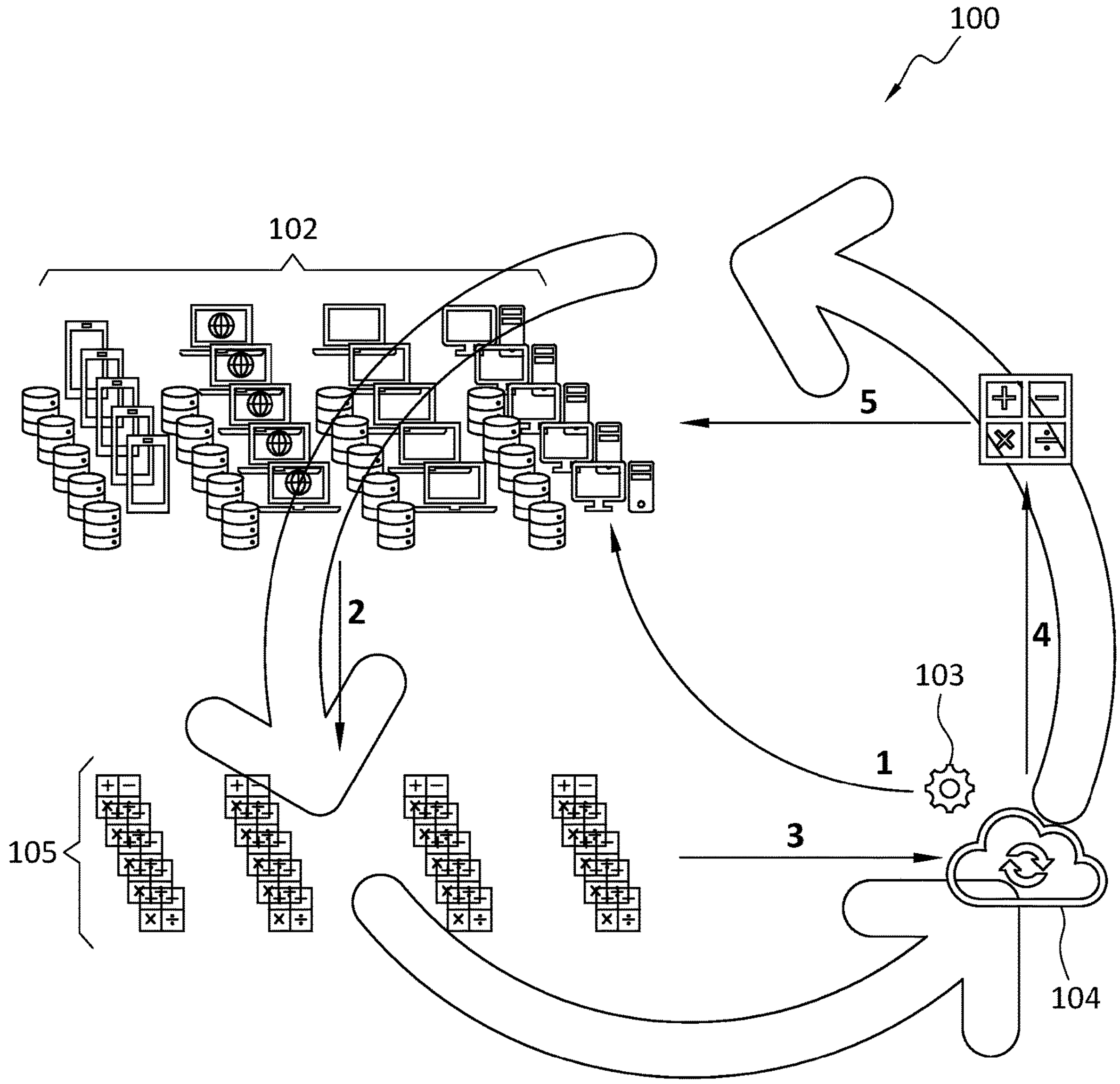
FIG. 1 discloses aspects of an implementation of federated learning, according to some embodiments.

Embodiments of the present invention generally relate to federated learning as applied to a group of connected nodes. More particularly, at least some embodiments of the invention relate to systems, hardware, software, computer-readable media, and methods for compression of gradients generated by the nodes so as to reduce the amount of data sent from the nodes to a central node, and for detection and avoidance of overfitting at one or more of the nodes.

In general, example embodiments of the invention are directed to a mechanism for switching between two low-bandwidth compressors according to the current training mode. The low bandwidth compressors may help to ensure that the information sent by one or more nodes to a central node does not overtax the network bandwidth capabilities of the system. As well, embodiments may identify a possible overfit of a node instance of a model, and then switch to a compressor that performs better in such regime. Thus, example embodiments may operate to reduce communication bandwidth consumed, by sending minimal information from the nodes to a central node, while also maintaining a good generalization of model instances at each of a plurality of nodes by a smart switching of data compressor type after automatic detection of possible overfitting of a respective model instance at one or more nodes.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect (s) or solution(s). Finally, it is not required that any embodiment implement any of the advantageous and unexpected effects disclosed herein.

In particular, an embodiment of the invention may reduce the network communication bandwidth needed for performance of a federated learning process involving a large group of nodes. An embodiment of the invention may be able to detect, and address, a model overfit problem at one or more nodes. An embodiment of the invention may operate to select, from among a group of options, an optimal data compression mode for one or more nodes involved in performance of a federated learning process. Various other advantages of example embodiments of the invention will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Overview

A recent white paper (Frost & Sullivan and Dell Technologies, *Intelligent Connected Mobility Is Reaching an Inflection Point—A Data-centric Future Requires a Platform Approach,* 2019) demonstrated that an inflection point in the rapidly changing mobility landscape is being reached. Particularly, the white paper addressed the connected vehicles space, which includes millions of vehicles collecting data, while processing, and learning, models in real time. The authors of the white paper expect a mobile industry disruption and, by 2030 already having 90 million autonomous vehicles and 1 ZB of data generated by the automotive industry. Also, the authors showed how the industry is currently aware of this and is reinventing products and platforms to prepare itself for the coming changes. Particularly, the white paper identified the following challenges: (1) harnessing data; (2) managing data; (3) implementing an effective cloud strategy; (4) implementing AI (artificial intelligence) and ML (machine learning); and, (5) lack of in-house talent and expertise.

With such considerations in view, example embodiments may consider, among other things, the AI and ML aspects of these challenges. One of the issues identified is the problem of dealing with the enormous amount of data that may be collected and processed by connected vehicles, and/or other by nodes. Thus, there is a need for a platform strategy for managing these intelligent fleets of vehicles.

Example embodiments may thus be directed to a training component of the models to be deployed at each node, or connected car, as part of such a platform. Particularly, embodiments may operate to train a central model, possibly located at a central node, that learns from the data being collected at each node, without the central model ever having to receive the data itself, but instead receiving only the training information coming from each node.

Further, embodiments may operate to keep the training information being generated by the nodes and sent to the central node to a minimum, assuming very low network bandwidth conditions. Moreover, embodiments may avoid overfitting the training model to the data available on, and specific to, each node. That is, embodiments may generate a final model that is generic to the respective data generated and/or collected at each node, and to any other subset of data coming from the same data distribution.

To these ends, and/or others, embodiments may provide a mechanism for switching between two training data compressors according to the possibility of entering an overfit regime. Particularly, an embodiment may identify a possible overfit and then switch to a compressor that performs better, than other compressor(s) in a defined group of compressors, in that regime. Example embodiments have been experimentally validated, and demonstrate that this method may have very low network bandwidth requirements and high, that is, accurate, prediction performance for unseen data, that is, data other than the data that was used to train the model. Put another way, embodiments may provide a relatively good generalization capability of a single model across multiple nodes, each of which is using an instance of the model, that may each be associated with different respective datasets.

As disclosed in further detail elsewhere herein, embodiments may (1) instantiate training information, such as information generated and/or collected by each node of a group of nodes, into gradients, (2) abstract the connected vehicles, or other entities, to be edge nodes, and (3) assume the use of a central node where the gradients from each edge node are combined into a common set of gradients that may be used by a central node to update the model. The training information may comprise, specifically, information generated by respective instances of the model operating at the nodes in a group of nodes. Note that the aforementioned instantiations and abstractions are presented by way of example, and are not intended to limit the scope of the invention, or its possible applications, in any way. Rather, example embodiments may be applied to a wide array of federated learning settings and use cases.

Embodiments may be employed in environments that may include a massive number of edge nodes, possibly numbering in the millions, and such environments may be characterized by constrained network communication bandwidth conditions. Thus, embodiments may operate to minimize their network bandwidth footprint. It is noted that while compression techniques for federated learning exist, such techniques may not be well suited for some situations. As noted earlier herein, data compressors may have better or worse performance at different times in an optimization process. Thus, example embodiments may be directed to the problem of how to reduce network communication bandwidth consumption, while also maintaining a good generalization of the model, and assuming low-bandwidth availability for performance of example methods according to some embodiments.

B. Background for Example Embodiments

In general, example embodiments may be directed to challenges posed by performance of a federated learning process under very low network bandwidth conditions. The following discussion of federated learning provides background for example embodiments.

In general, FL (federated learning) includes machine learning techniques that may have, as a goal, the training of a centralized model using training data that remains distributed on a large number of client nodes. Respective instances of the centralized model may be executable at one or more nodes, which may be comprise edge nodes, and which may be referred to herein as 'client nodes,' to perform various functions, and the execution of the model instances may result in the generation of data at each node where a respective instance of the centralized model is running.

Typically, the network connections of such client nodes are unreliable and slow, and such client nodes typically have limited processing power. Thus, federated learning processes may implement an approach in which the client nodes may collaboratively refine a shared machine learning model, such as a DNN (deep neural network) for example, while keeping the training data, generated at the client nodes, private on the client devices, so that the model can be refined without requiring the storage of a huge amount of client node data in the cloud, or in a central node that is responsible to implement node-driven refinements to the model.

As used herein in an FL context, a central node may be any system, machine, or device, any of which may comprise hardware and/or software, with reasonable computational power, that receives data from one or more client nodes and updates the shared model using that data. A client node may be any system, machine, or device such as an edge device or IoT (Internet of Things) device, any of which may comprise hardware and/or software, that contains and/or generates data that may be used for training the machine learning model. Thus, example client nodes include, but are not limited to, connected cars, mobile phones, storage systems, network routers, and any IoT device.

With reference now to FIG. 1, a simplified training cycle 100, according to some embodiments, for an FL process is disclosed. The cycle may include various iterations, or rounds. Such iterations may include, in this example: (1) the client nodes 102 download the current model 103 from the central node 104—if this is not the first round, the shared model may be randomly initialized at the client nodes; (2) next, each client node 102 may then train a respective instance of the model, using its local data, during a user-defined number of epochs; (3) the model updates 105 are sent from the client nodes 102 to the central node 104—in some example embodiments, these model updates 105 sent by the client nodes 102 may comprise one or more vectors containing gradients; (4) the central node 104 aggregates these vectors received from the various client nodes 102 and updates the shared model 103 based on, or using, the vectors and gradients; and (5) if the predefined number of rounds E is reached, finish the training, otherwise, go to (1) again.

In general, a node may generate a gradient vector, or simply 'vector,' that may contain multiple values, such as numbers for example. In some embodiments, gradient values may be positive, or negative. A vector may comprise any combination of positive and/or negative gradients.

The values in the vector may reflect the changes that a particular node has made, or recommends be made, to its respective instance of a shared model. These changes made by the node may be implemented based on, for example, a comparison, by the node, of the output data of the model instance with another set of data, such as ground truth data for example. In this way, the node may be able to capture a variation of the performance of the model instance from a needed or expected performance. This variation may be the basis for generation of the gradients, which may constitute an expression of the node as to what changes should be made to the model so as to bring model performance into line with a standard or expectation.

Figure 2:
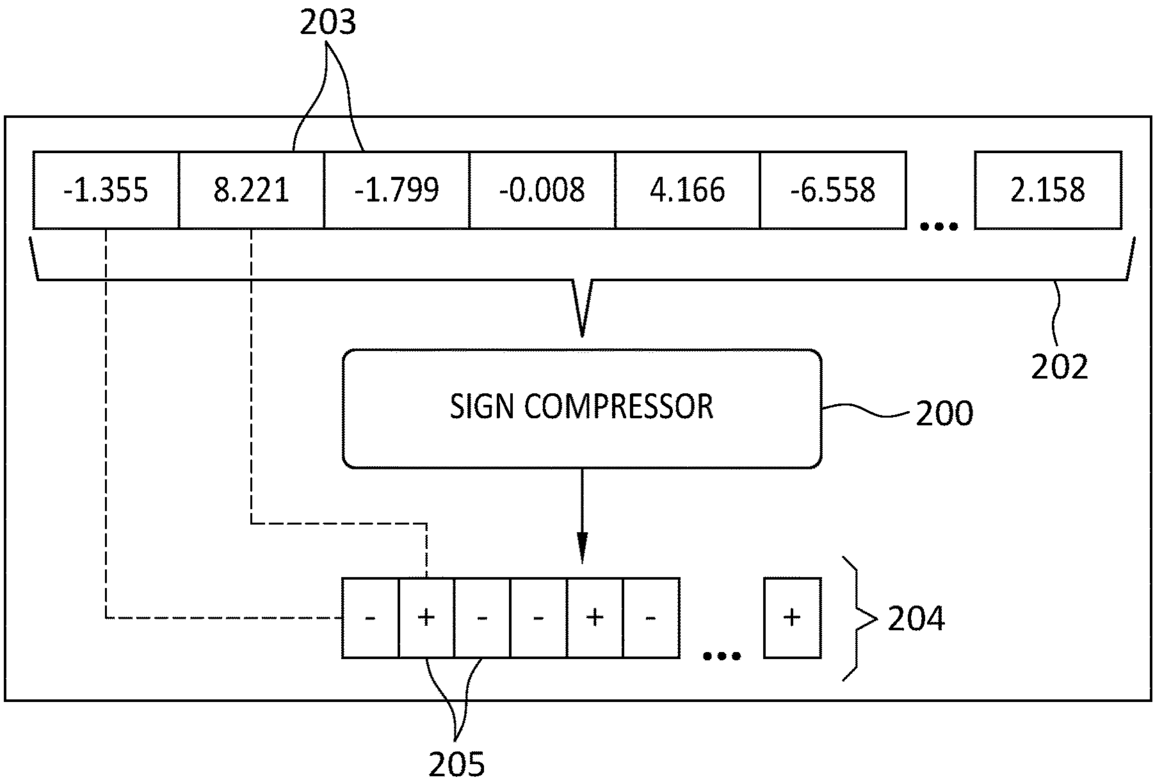
FIG. 2 discloses aspects of sign compression, according to some embodiments.

In order to send a vector from a client node to the central node using a small amount of bandwidth, example embodiments may employ a sign compressor. In general, a sign compressor may receive, as input, the original vector generated by a client node, and outputs a vector composed of the signs of each number in the original vector. With reference now to FIG. 2, an example sign compressor and some of its operations are disclosed.

Particularly, a sign compressor 200 is disclosed that receives, as input, an original vector 202 generated by, for example, a node. As shown, the gradients 203 in the vector 202 may have positive, or negative, values, such as the gradient 203 which is positive, and the adjacent gradient 203 which is negative. The gradients 203 may comprise respective float numbers.

As shown, the sign compressor 200 may operate to strip out the specific gradient values, which may vary in magnitude, and may retain only the indications as to whether a particular gradient has a positive, or negative, value. Thus, the output vector 204 generated by the sign compressor 200 comprises gradients 205 that may be binary in nature, and each of the gradients 205 may correspond to a respective gradient 203, as indicated by the illustrative broken lines. A sign of a particular gradient may be referred to herein as an 'index,' such that a compressed vector that includes only signs of gradients may be referred to as comprising a set of indexes.

Note that the sign compressor 200 may, by generating a vector whose constituents each only have 2 possible values, greatly reduce the number of bits sent from the client nodes to the central node. For example, if the original vector is formed by 'd' 64-bit floating numbers, the total number of bits sent by each client is ('d'×64 bits). However, the sign compressor only needs to send 'd' bits, that is, just a single bit per gradient value, where each bit is either 0 or 1, reflecting that the gradient value is either negative or positive, respectively. In this example then, the compression ratio is 64× when using the sign compressor 200.

Figure 3:
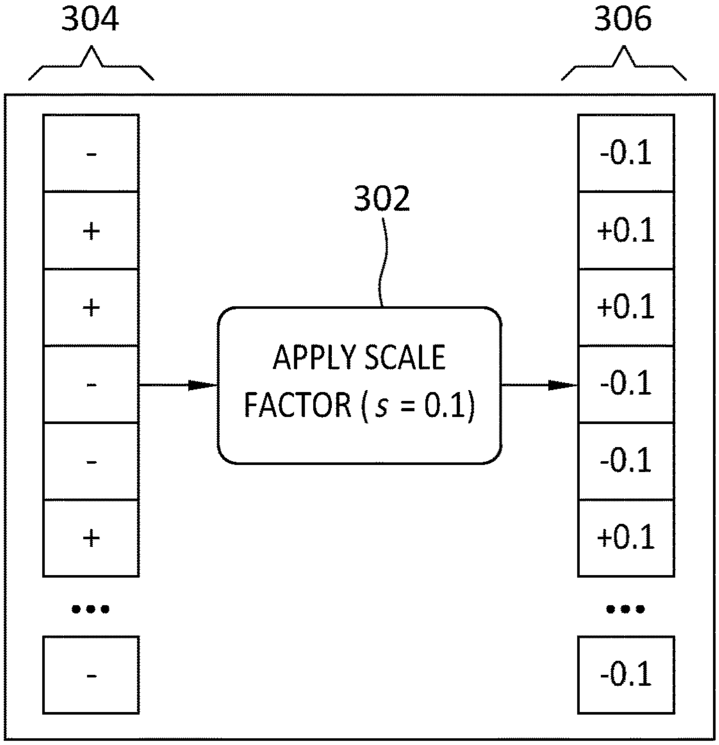
FIG. 3 discloses a vector scaling process, according to some embodiments.

Once the vector 202, for example, is compressed at a client node to create the vector 204, for example, and the vector 204 is sent to a central node, it may be necessary to decompress the vector 204 so it can be used by the central node in the learning process of the neural network model. To implement this decompression of a compressed vector, and with attention now to the example of FIG. 3, embodiments may apply a scale factor 302 's' that may provide significance to the signs in the vector 304. No particular scale factor is required in any embodiment, and the particular scale factor employed may be the same at each node, or may vary from one node to another. The vector 306 resulting from the application of the scale factor 302 to the compressed vector 304 may then be aggregated with other vectors in the central node and used by the central node to update the shared model.

C. Detailed Discussion of Some Example Embodiments

Example embodiments of the invention include, among other things, methods for the federated training of models with enhanced generalization in low bandwidth/poor network conditions. An example method may employ the following components and operations: a gradient compressor that may be applied to gradients learned and obtained in the training nodes; a mechanism for assessing and monitoring the overfitting of the partially trained models; and, a mechanism operable, based on that assessment, to change from the gradient compressor to a specialized compressor of training information that allows for further training of the centralized node, while maintaining generalization of the model.

Respective instances of each of a gradient compressor and a specialized compressor may reside at each node in a group of nodes. This decentralization of the compression functionality may enable better overall performance than if vectors from all the nodes were sent to a single, or only a few, compression sites.

An example gradient compressor and a decision framework, according to some example embodiments, may be comprise three parts: (1) a gradient compressor, which may be denoted as Sign Compressor, which sends only the sign of each gradient in the vector; (2) a compressor called RandomPercSigns, which may send only a subset of the signs of the original gradient vector—thus, it may be the case that only a fraction of the gradients are sent to the central node; and, (3) a mechanism to control model generalization, that is, to limit overfitting, by switching between the two compression methodologies—note that, as an example, sending 25% of the signs from an original float32 gradient vector may imply the use of 1/128, or approximately 0.8%, of the original amount of information in that original float32 gradient vector.

C.1 Random Percentage Sign (RPS) Compressor

As disclosed elsewhere herein, the Sign Compressor may reduce the amount of data sent from a client node to a central node. However, it may sometimes be the case that sending all the values of a vector, or vectors, may lead the shared model at the central node to overfit on the training data generated by the node, or nodes, that generated that vector, or vectors.

To address such circumstances, example embodiments may provide a compressor, referred to herein as the RandomPercSign (RPS) Compressor, which may operate to reduce the vector size by (1) keeping only the signs of the gradients in a vector, as the Sign Compressor does, while also (2) sending only a portion, that is, less than all, of the resulting compressed sign vector from the client node to the central node.

Figure 4:
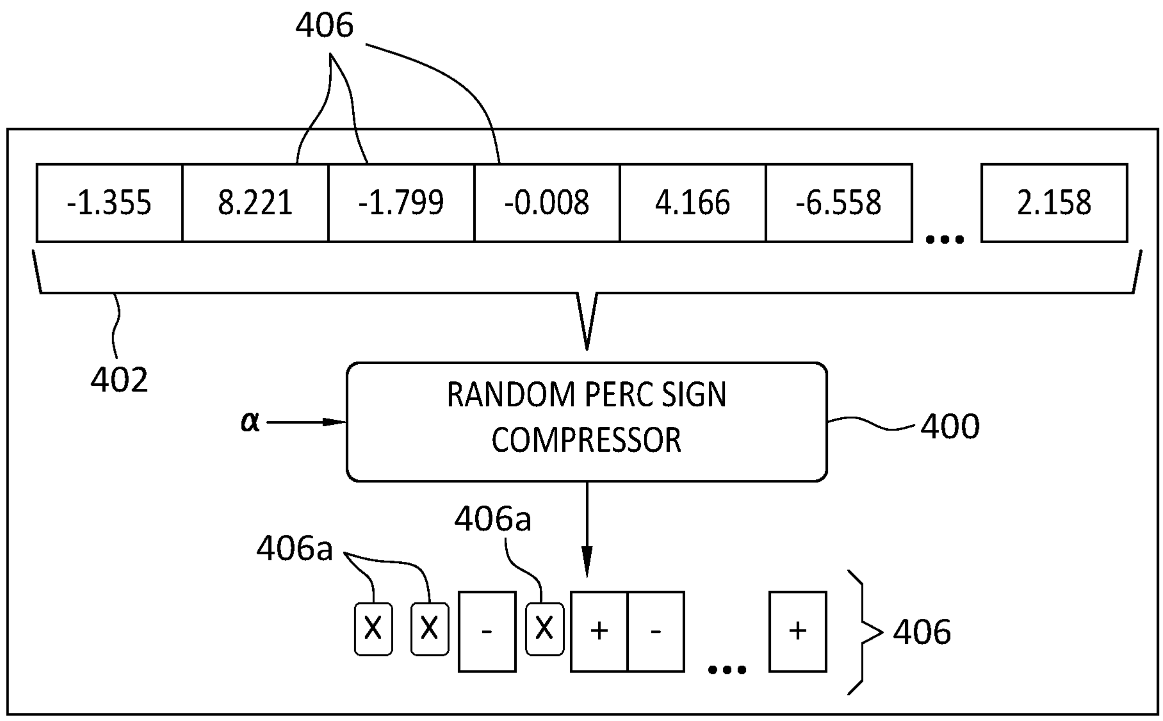
FIG. 4 discloses an RPS compression process, according to some example embodiments.

An example of the operation of an embodiment of an RPS compressor is disclosed in FIG. 4, which depicts the operation of an RPS compressor 400 on a vector 402 comprising a group of float numbers, or gradients, a few of which are referenced at 404. In the illustrative example of FIG. 4, the RPS compressor 400 creates a vector that includes only the signs of the gradients of the vector 402, and then removes, possibly on a random basis, one or more of the signs from the vector of signs, to generate the final vector 406. In the example of FIG. 4, three signs 406*a* have been removed.

Note, with reference to the example of FIG. 4, that a client node may perform the operation(s) that reduce the size of the initial vector 402 and, moreover, respective vector size reductions may be performed at multiple nodes in a network. To do this, the RPS compressor 400 may receive, as input, a user-defined parameter ($\alpha$) that provides a reduction factor to be applied by the RPS compressor 400 to the input vector 402. So, once this reduction factor is given, the RPS compressor 400 may generate, or otherwise identify, a set of indexes that will be removed from the compressed vector, that is, the vector that includes only the signs from the original vector 404, before the resulting vector 406 is sent. This set of indexes to be removed may be generated at the central node and at the client node, using a shared random seed, so there may be no need to send that set of indexes throughout the network, since the random seed may be agreed to beforehand.

Figure 5:
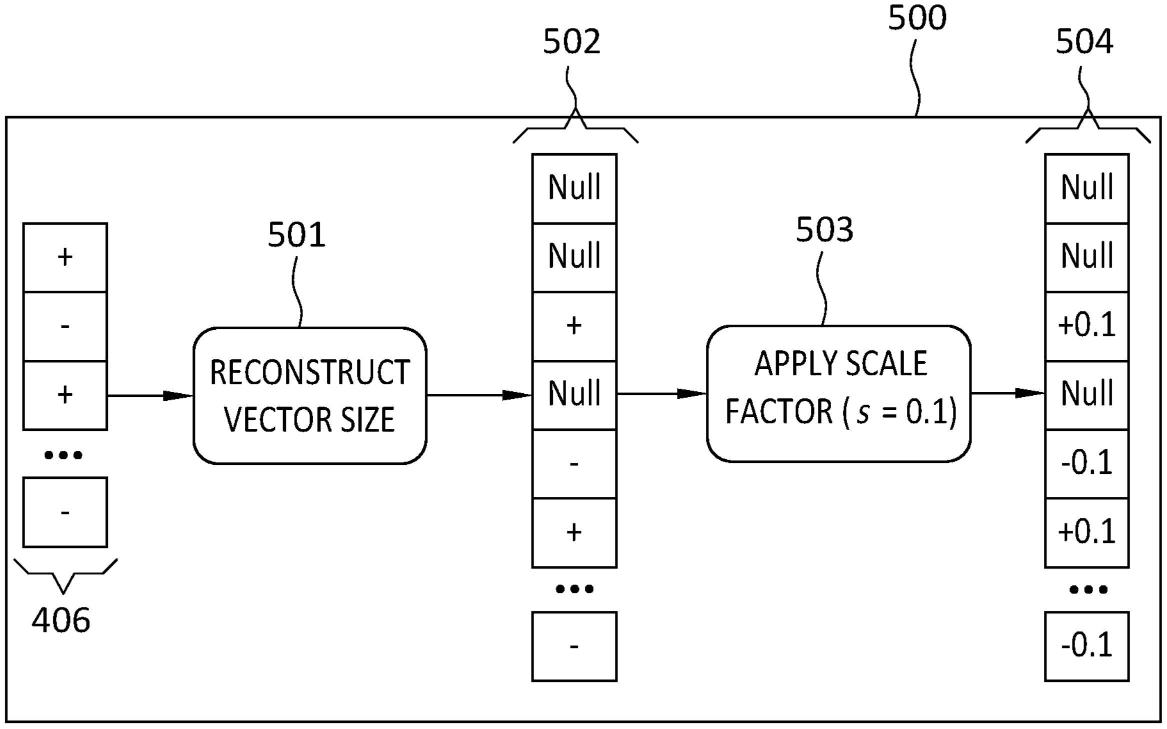
FIG. 5 discloses a vector decompression process, according to some example embodiments.

Turning next to FIG. 5, which discloses the reconstruction of, and application of a scale factor to, a compressed vector, once a vector, such as the vector 406 for example, arrives at a central node 500, that vector 406 may be reconstructed 501 to its original size. So, indexes not sent, such as the indexes 406*a* of FIG. 4 for example, are filled with 'Null' and the remaining values are put in order in the reconstructed vector 502, according to their original order in the vector 406. Then, the central node 500 may apply 503 a scale factor as well, in the same manner as a Sign Compressor applies a scale factor. The resulting vector 504 may now be aggregated with the respective vectors of one or more other client nodes to make the training of the neural network possible.

It is noted that, as the case may also be with the Sign Compressor, the RPS compressor, such as the RPS compressor 400 for example, may significantly reduce the number of bits sent from a client node to a central node. For example, if the original vector generated by a client node is formed by 'd' 64-bit floating numbers, the amount of bits sent by a client node would be ($d \times 64$) bits. However, the RPS compressor may send only ($\alpha \times d$) bits (see FIG. 4). In other words, in the example case where $\alpha = 0.1$, the compression ratio is 640× when using the RPS compressor.

C.2 Decision Mechanism to Control Model Generalization

The lack of generalization of a model is a significant problem that may arise when training a neural network that specializes in its own data. Particularly, if a model is not adequately generalized, it may produce results that are particularly good for some nodes, but may also produce especially poor results at other nodes. By appropriate generalization, a model may be created and refined that may provide generally good results for all nodes in a group of nodes.

It is noted that each client node may contribute to the training of the shared model using its own private data, that is, client node data. Thus, each client node may be prone to favor its own data, that is, to learn the distribution of its own training data, potentially overfitting the partial model, that is, the model instance updated at the client node, and consequently worsening the generalization of the shared model. Put another way, the changes requested by a node to the shared model may be biased in favor of, and specific to, the partial model operating at that particular node. By incorporating this bias, the partial model may be said to be overfit with respect to the node, since the partial model may apply well to that specific node, but not as well to other nodes. However, it is typically desired that a shared model should have good predictive power over data coming from each and every node where it is deployed, and not just good predictive power for some subset of those nodes.

As described earlier in connection with FIG. 1, the process of training a model in a federated learning setting may be performed by training many partial neural network models, or model instances, one at each node. The result of this training, that is, a vector that identifies potential changes, in the form of gradients, to the shared model, may be compressed, such as with a Sign Compressor for example, sent to the central node, aggregated, and the shared model may then be updated and redistributed to each client node to either be used in a production setting, or to continue the training process.

In order to avoid overfitting in the training of the partial model, or model instance, trained at the client node, embodiments may provide a decision mechanism, respective instances of which may operate at each node, that determines whether the model instance at the node is overfitting over the private training data of that node, and if the answer is 'yes,' the model instance is overfitting, embodiments may change the compressor being used, such as a Sign Compressor, to a compressor, such as the RPS compressor, that is more resistant, relative to the Sign Compressor, to overfitting. Embodiments may establish a flag on the central node so that the central node knows which compressor is being used by each node, such as each edge node, in order for the central node to correctly decompress the incoming gradient information from those nodes, thus dealing with nodes of different speed that might be sending gradients compressed by different compressors.

C.3 Example Compressor Switching Algorithm

Directing attention now to FIG. 6, an algorithm 600 for compressor switching, according to some example embodiments, is disclosed. As shown in FIG. 6, there are two free hyperparameters: E, the slope threshold for the linear regression; and 1, the lookback on the validation loss curve. As an example, default values for these hyperparameters E and 1 could be set, for example, at 0.01 and 10 respectively. Each edge node, or other node, may switch compressors (from Sign to RPS) according to an automatic detection of overfitting according to the edge node current validation curve, with a pre-defined lookback 1, where the lookback is the number of points, or validation error quantities, that may be collected by a node and used to create the validation curve for that node.

Embodiments may provide a modified federated learning algorithm to contain a respective decision, as to which compressor will be used, made by each edge node. The first part of this decision may be accumulating a list of validation errors, or points, with a pre-defined lookback. Next, a linear regression may be fitted to this list of validation values in order to arrive at a slope of the fitted line. If the magnitude of the slope is above a pre-defined threshold ($\in$), embodiments may assume that overfitting is occurring, or is about to occur, and switch to a different compressor of that edge node. Embodiments may implement a similar decision at the central node, and switch the decompressor for vectors incoming at the central node from the given edge nodes.

D. Further Discussion

As disclosed herein, example embodiments may include a method that achieves a good generalization error while minimizing the amount of information that is sent by one or more client nodes to a central node that is responsible to maintain the central model. Particularly, example methods and mechanisms are disclosed that may operate to deal with the generalization error when training a neural network in a federated learning setting. This may be done by changing the gradient compressor when overfitting is detected. Such detection may be possible by measuring by the slope of a linear regression fitting on the past validation losses, with a pre-defined lookback.

E. Example Experimental Results

In order to validate an example embodiment of one of the disclosed methods, the inventors implemented the decision mechanism into a FL framework. The inventors ran the experiments for the FashionMNIST benchmark, with four distinct versions of neural networks trained in a federated fashion, described as follows, and as shown in the example graph 700 of FIG. 7. Particularly, a Neural Network (NN) trained without using any gradient compression is indicated by curve 7.1, a NN trained with the RPS compressor with parameters $\alpha$=0.1 and s=0.1 is indicated by curve 7.2, a NN trained with the RPS compressor with parameters $\alpha$=0.1 and s=1 is indicated at curve 7.3, and a NN trained with the decision mechanism with parameters $\alpha$=0.1 and s=1 is indicated at curve 7.4.

Figure 7:
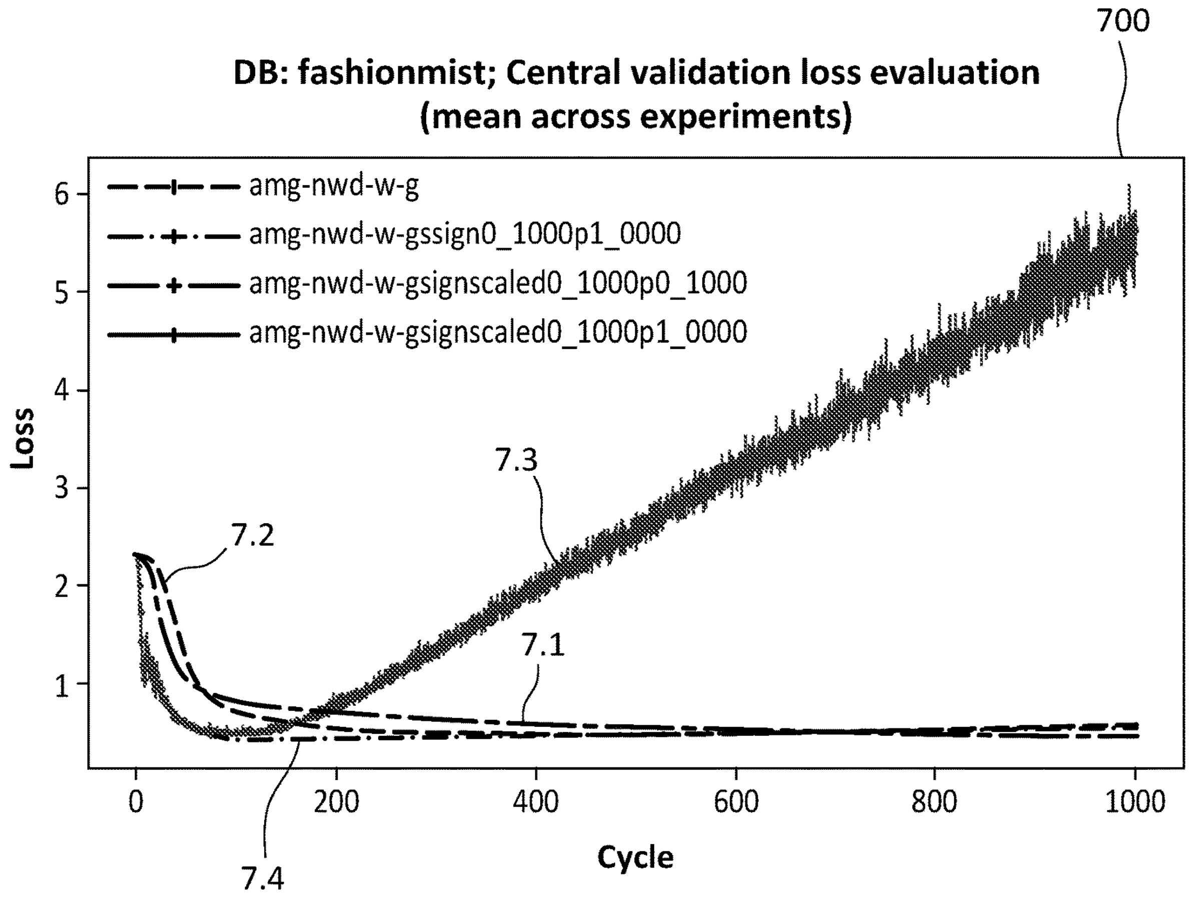
FIG. 7 discloses experimental results obtained with an example embodiment.

This example experiment was executed over 3 runs with different random seeds, with 1000 rounds (or cycles), and 1 epoch of training on each client node. Furthermore, the hyperparameters E and 1 were set at 0.01 and 10, respectively. FIG. 7 depicts the results of the experiment. It can be seen that when the federated trained neural network starts to overfit, the loss starts worsening around round 100 of the curve 7.3. However, when applying a compressor decision mechanism according to some example embodiments, the results are controlled with smaller loss, as shown around round 100 of the curve 7.4. Finally, it is noted that the best results were achieved using only a fraction of the available gradients, saving considerable network communication bandwidth in the process.

F. Example Methods

Figure 8:
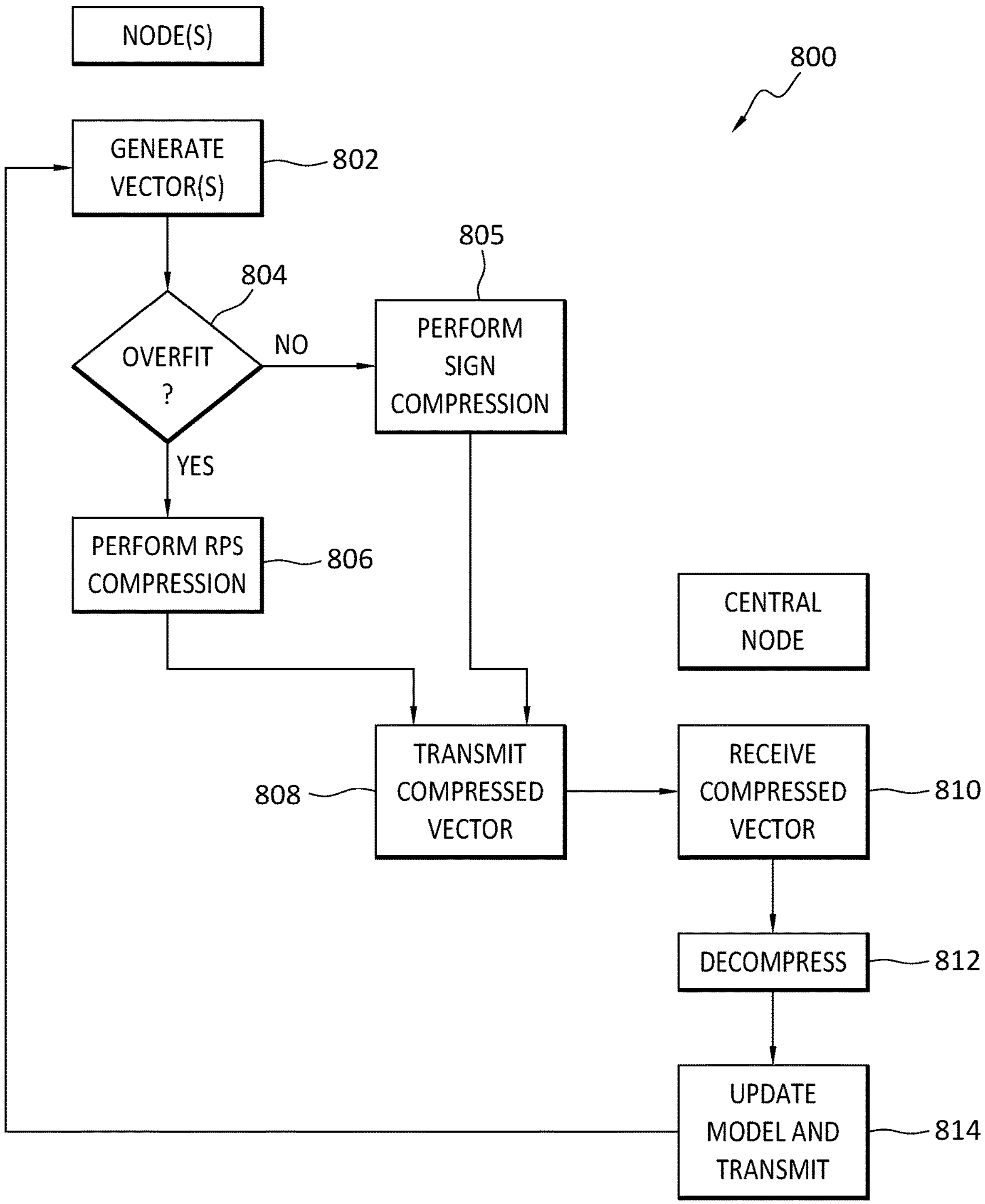
FIG. 8 discloses an example method for vector compression selection, according to some embodiments.

It is noted with respect to the disclosed methods, including the example method of FIG. 8, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Directing attention now to FIG. 8, an example method 800 is disclosed that may begin at 802 when a node generates, or causes the generation of, a vector that includes one or more gradients which may constitute, or indicate, changes to a central model shared by the node with one or more other nodes. After the vector has been generated 802, a check 804 may be performed to determine whether an instance of the central model that runs at the node is overfitting with regard to data generated at the node.

If overfitting is not detected at 804, the vector may be compressed 805, using sign compression for example. On the other hand, if overfitting is detected at 804, the vector may be compressed 806 using RPS compression. In either case, the compressed vector may then be transmitted 808 to a central node.

The central node may then receive 810 the compressed vector from the node. The compressed vector may be decompressed 812 at the central node. The type of decompression used at 812 may be a function of the type of compression, either 805 or 806, that was performed at the node initially. After the vector has been decompressed 812, information from the decompressed vector may be used by the central node to update the central model, and the updated central model may then be transmitted 814 to the node(s) for further training, or for use in a production setting.

E. Further Example Embodiments

Following are some further example embodiments of the invention. These are presented only by way of example and are not intended to limit the scope of the invention in any way.

Embodiment 1. A method, comprising: in an edge node, of a group of edge nodes that are each operable to communicate with a central node, performing operations comprising: generating a vector that includes gradients associated with a model instance, of a central model, that is operable to run at the edge node; performing a check to determine whether the model instance is overfitting to data generated at the edge node, and either: performing sign compression on the vector when overfitting is not indicated; or performing random perc sign compression on the vector when overfitting is indicated; and transmitting the vector, after compression, to the central node that includes the central model.

Embodiment 2. The method as recited in embodiment 1, wherein performing sign compression comprises creating a vector that includes respective signs of the gradients, but not the gradients themselves.

Embodiment 3. The method as recited in any of embodiments 1-2, wherein performing random perc sign compression comprises: performing sign compression on the vector to create an output vector that includes signs of the gradients, but not the gradients themselves; and randomly removing one or more signs from the output vector to create the vector that is transmitted to the central node.

Embodiment 4. The method as recited in embodiment 3, wherein the signs removed from the output vector are removed based on a user-defined parameter ($\alpha$) that provides a reduction factor applied to the vector.

Embodiment 5. The method as recited in embodiment 3, wherein signs remaining in the output vector maintain the same order as in the uncompressed vector.

Embodiment 6. The method as recited in any of embodiments 1-5, wherein the presence, or lack, of overfitting is determined based on a slope of a linear regression that includes validation data points generated at the edge node.

Embodiment 7. The method as recited in any of embodiments 1-6, wherein when sign compression is performed, a scaling factor is applied to signs in the resulting compressed vector.

Embodiment 8. The method as recited in any of embodiments 1-7, wherein each gradient corresponds to a respective aspect of a configuration and/or operation of the model instance.

Embodiment 9. The method as recited in any of embodiments 1-8, wherein the operations further comprise receiving, by the edge node from the central node, an updated central model that was created in part based on the compressed vector sent by the edge node to the central node.

Embodiment 10. The method as recited in any of embodiments 1-9, wherein the compressed vector sent by the edge node to the central node is decompressible with a scaling factor.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 9:
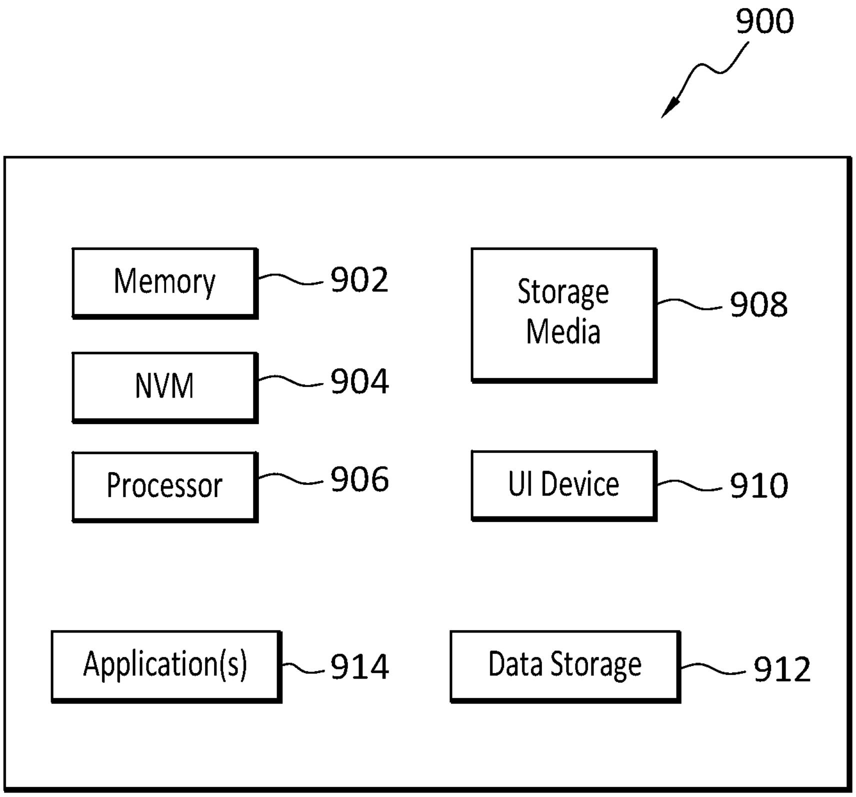
FIG. 9 discloses an example computing entity operable to perform any of the claimed methods, processes, and operations.

With reference briefly now to FIG. 9, any one or more of the entities disclosed, or implied, by FIGS. 1-8 and/or elsewhere herein, may take the form of, or include, or be implemented on, or hosted by, a physical computing device, one example of which is denoted at 900. As well, where any of the aforementioned elements comprise or consist of a virtual machine (VM), that VM may constitute a virtualization of any combination of the physical components disclosed in FIG. 9.

In the example of FIG. 9, the physical computing device 900 includes a memory 902 which may include one, some, or all, of random access memory (RAM), non-volatile memory (NVM) 904 such as NVRAM for example, read-only memory (ROM), and persistent memory, one or more hardware processors 906, non-transitory storage media 908, UI (user interface) device 910, and data storage 912. One or more of the memory components 902 of the physical computing device 900 may take the form of solid state device (SSD) storage. As well, one or more applications 914 may be provided that comprise instructions executable by one or more hardware processors 906 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for federated training of a central model under constrained network bandwidth conditions, comprising:

in each edge node of a group of edge nodes that are each operable to communicate with a central node, locally training a model instance of the central model using training data generated at each edge node;

generating, by each edge node, a vector that includes gradients associated with the model instance of the central model;

determining, by each edge node, whether the model instance is overfitting to data generated at each edge node based on a slope of a linear regression fitted to validation data points generated at each edge node;

transmitting, by each edge node, a compressed vector from each edge node to the central node, wherein each edge node is configured to:

in response to a determination that the model instance is not overfitting to the data, use a sign compressor to generate the compressed vector such that the compressed vector includes signs of the gradients and excludes magnitudes of the gradients; and in response to a determination that the model instance is overfitting to the data, use a random percentage sign compressor to generate the compressed vector such that the compressed vector includes a randomly selected subset of the signs of the gradients and excludes non-selected signs of the gradients; and causing the central node to decompress compressed vectors transmitted from every edge node and aggregate the decompressed vectors to update the central model.

2. The method as recited in claim 1, wherein the signs randomly removed from the gradients are removed based on a user-defined parameter ($\alpha$) that provides a reduction factor applied to the vector.

3. The method as recited in claim 1, wherein signs remaining in the compressed vector maintain a same order as in a uncompressed vector.

4. The method as recited in claim 1, wherein presence or lack of overfitting is determined based on a slope of a linear regression that includes the validation data points generated at each edge node.

5. The method as recited in claim 1, wherein in response to the determination that the model instance is not overfitting to the data, a scaling factor is applied to signs in the compressed vector.

6. The method as recited in claim 1, wherein each gradient corresponds to a respective aspect of a configuration, update, and/or operation, of the model instance.

7. The method as recited in claim 1, further comprising:

receiving, by each edge node from the central node, an updated central model that was created in part based on the compressed vector sent by each edge node to the central node.

8. The method as recited in claim 1, wherein the compressed vector sent by each edge node to the central node is decompressible with a scaling factor.

9. The method as recited in claim 1, wherein each edge node and the central node use a shared random seed to identify the non-selected signs excluded from the randomly selected subset.

10. A non-transitory storage medium having stored therein instructions that are executable by one or more hardware processors to perform operations for federated training of a central model under constrained network bandwidth conditions, the operations comprising:

locally training, by each edge node, of a group of edge nodes that are each operable to communicate with a central node, a model instance of the central model using training data generated at each edge node;

generating, by each edge node, a vector that includes gradients associated with the model instance of the central model;

determining, by each edge node, whether the model instance is overfitting to data generated at each edge node based on a slope of a linear regression fitted to validation data points generated at each edge node;

transmitting, by each edge node, a compressed vector from each edge node to the central node, wherein each edge node is configured to:

in response to a determination that the model instance is not overfitting to the data, use a sign compressor to generate the compressed vector such that the compressed vector includes signs of the gradients and excludes magnitudes of the gradients; and in response to a determination that the model instance is overfitting to the data, use a random percentage sign compressor to generate the compressed vector such that the compressed vector includes a randomly selected subset of the signs of the gradients and excludes non-selected signs of the gradients; and causing the central node to decompress compressed vectors transmitted from every edge node and aggregate the decompressed vectors to update the central model.

11. The non-transitory storage medium as recited in claim 10, wherein the signs randomly removed from the gradients are removed based on a user-defined parameter ($\alpha$) that provides a reduction factor applied to the vector.

12. The non-transitory storage medium as recited in claim 10, wherein signs remaining in the compressed vector maintain a same order as in a uncompressed vector.

13. The non-transitory storage medium as recited in claim 10, wherein presence or lack of overfitting is determined based on a slope of a linear regression that includes the validation data points generated at each edge node.

14. The non-transitory storage medium as recited in claim 10, wherein in response to the determination that the model instance is not overfitting to the data, a scaling factor is applied to signs in the compressed vector.

15. The non-transitory storage medium as recited in claim 10, wherein each gradient corresponds to a respective aspect of a configuration, update, and/or operation, of the model instance.

16. The non-transitory storage medium as recited in claim 10, wherein the operations further comprise receiving, by each edge node from the central node, an updated central model that was created in part based on the compressed vector sent by each edge node to the central node.

17. The non-transitory storage medium as recited in claim 10, wherein the compressed vector sent by each edge node to the central node is decompressible with a scaling factor.

18. The non-transitory storage medium as recited in claim 10, wherein each edge node and the central node use a shared random seed to identify the non-selected signs excluded from the randomly selected subset.

* * * * *